US006311476B1

(12) United States Patent
Frye et al.

(10) Patent No.: US 6,311,476 B1
(45) Date of Patent: Nov. 6, 2001

(54) INTEGRAL PROPULSION AND POWER RADIANT CAVITY RECEIVER

(75) Inventors: Patrick Edward Frye, Simi Valley; Charles T. Kudija, Jr., Newhall, both of CA (US)

(73) Assignee: The Boeing Company, Seattle, WA (US)

( * ) Notice: Subject to any disclaimer, the term of this patent is extended or adjusted under 35 U.S.C. 154(b) by 59 days.

(21) Appl. No.: 09/590,624

(22) Filed: Jun. 8, 2000

(51) Int. Cl.[7] ........ G21D 1/00
(52) U.S. Cl. ........ 60/203.1
(58) Field of Search ........ 60/200.1, 203.1

(56) References Cited

U.S. PATENT DOCUMENTS 4,171,617 10/1979 Sakamoto et al. .
4,316,048 * 2/1982 Woodall ........ 136/253
4,419,532 * 12/1983 Severns ........ 136/253
4,528,978 * 7/1985 Robinson ........ 60/203.1
4,686,961 8/1987 Garrison .
4,781,018 11/1988 Shoji .
4,815,443 * 3/1989 Vrolyk et al. ........ 126/438
4,903,479 * 2/1990 Christe ........ 60/203.1
5,138,832 8/1992 Pande .
5,200,141 * 4/1993 Fitzpatrick ........ 376/321
5,246,505 * 9/1993 Mowery, Jr. ........ 136/202
5,459,996 10/1995 Malloy, III et al. .
5,518,554 5/1996 Newman .
5,928,436 7/1999 Borkowski et al. .
6,065,284 * 5/2000 Horner et al. ........ 60/203.1
6,160,336 * 12/2000 Baker, Jr. et al. ........ 310/74

* cited by examiner

*Primary Examiner*—Ted Kim
(74) *Attorney, Agent, or Firm*—Harness Dickey & Pierce P.L.C.

(57) ABSTRACT

A solar thermal engine for propelling and powering a craft. The solar thermal engine includes a housing, a propellant annulus, a plurality of static power converters and an electrical energy storage device. The housing has an optical cavity for receiving a beam of concentrated sunlight and converting the beam into ambient thermal energy. The propellant annulus is coupled to the housing and is selectively operable in a heating mode wherein the propellant annulus transmits at least a first portion of the ambient thermal energy to heat a flow of propellant. The plurality of static power converters are coupled to the housing and receive the first portion of the ambient thermal energy when the propellant annulus is not operated in the heating mode. The plurality of static power converters employ the first portion of the ambient thermal energy to generate electrical energy. The electrical energy storage device is coupled to the plurality of static power converters and receives and stores the electrical energy generated by the plurality of static power converters. A method for propelling and powering a craft is also provided.

20 Claims, 3 Drawing Sheets

Electro-chemical storage device
Electro Mechanical storage device
50 26 11 11 10 23 23 23 44 42 38 52 20 22 12 16 30 18 36 24 14 32 36 16a 20a 16b 38 20 22a 20b 36 22

Electro-chemical storage device
Electro Mechanical storage device
50
52
26
12
24
10
11
14
16
16a
16b
18
20
20a
20b
22
22a
23
30
32
36
38
42
44

INTEGRAL PROPULSION AND POWER RADIANT CAVITY RECEIVER

TECHNICAL FIELD

The present invention relates generally to power generating systems for orbit transfer vehicles. More particularly, the present invention relates to a power generating system that is incorporated with a direct gain propulsion system to convert solar thermal energy into electric energy that may be stored in a battery.

BACKGROUND OF THE INVENTION

Background Art

Space propulsion systems using solar thermal energy have been proposed as a means to achieve greater payload fractions. These engines can be used, for example, to provide thrust to boost payloads from low earth orbits to higher orbits or to alter the orbit of a payload. In such engines, solar radiation is captured and focused by mirrors into a "black body" where the solar radiation is used to heat a propellant, such as hydrogen. The propellant is then passed through a nozzle to create thrust.

To further reduce the weight of the orbit transfer vehicle and increase the payload fraction, U.S. Pat. No. 5,459,996 entitled "Hybrid Solar Rocket Utilizing Thermal Storage for Propulsion and Electrical Power", the disclosure of which is hereby incorporated by reference as if fully set forth herein, has suggested a solar thermal rocket engine that utilizes energy conversion diodes to convert stored thermal energy into electrical energy. This configuration, however, does not reduce the weight of the orbit transfer vehicle to the maximum extent possible due to the relative inefficiency with which stored thermal energy is converted into electrical energy. The inefficiency of this process necessitates the use of a large and relatively heavy thermal storage device.

SUMMARY OF THE INVENTION

It is one object of the present invention to provide a solar thermal engine which does not rely on stored thermal energy for powering a craft.

It is a more specific object of the present invention to provide a solar thermal engine which employs a plurality of static power converters to convert ambient thermal energy to electrical energy which is then stored in an electrical storage device.

It is yet another object of the present invention to provide a method for propelling and powering a craft which does not rely on stored thermal energy for powering the craft.

In one preferred form, the present invention provides a solar thermal engine for propelling and powering a craft. The solar thermal engine includes a housing, a propellant annulus, a plurality of static power converters and an electrical energy storage device. The housing has an optical cavity for receiving a beam of concentrated sunlight and converting the beam into ambient thermal energy. The propellant annulus is coupled to the housing and is selectively operable in a heating mode wherein the propellant annulus transmits at least a first portion of the ambient thermal energy to heat a flow of propellant. The plurality of static power converters are coupled to the housing and receive the first portion of the ambient thermal energy when the propellant annulus is not operated in the heating mode. The plurality of static power converters employ the first portion of the ambient thermal energy to generate electrical energy. The electrical energy storage device is coupled to the plurality of static power converters and receives and stores the electrical energy generated by the plurality of static power converters. A method for propelling and powering a craft is also provided.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

Figure 1:
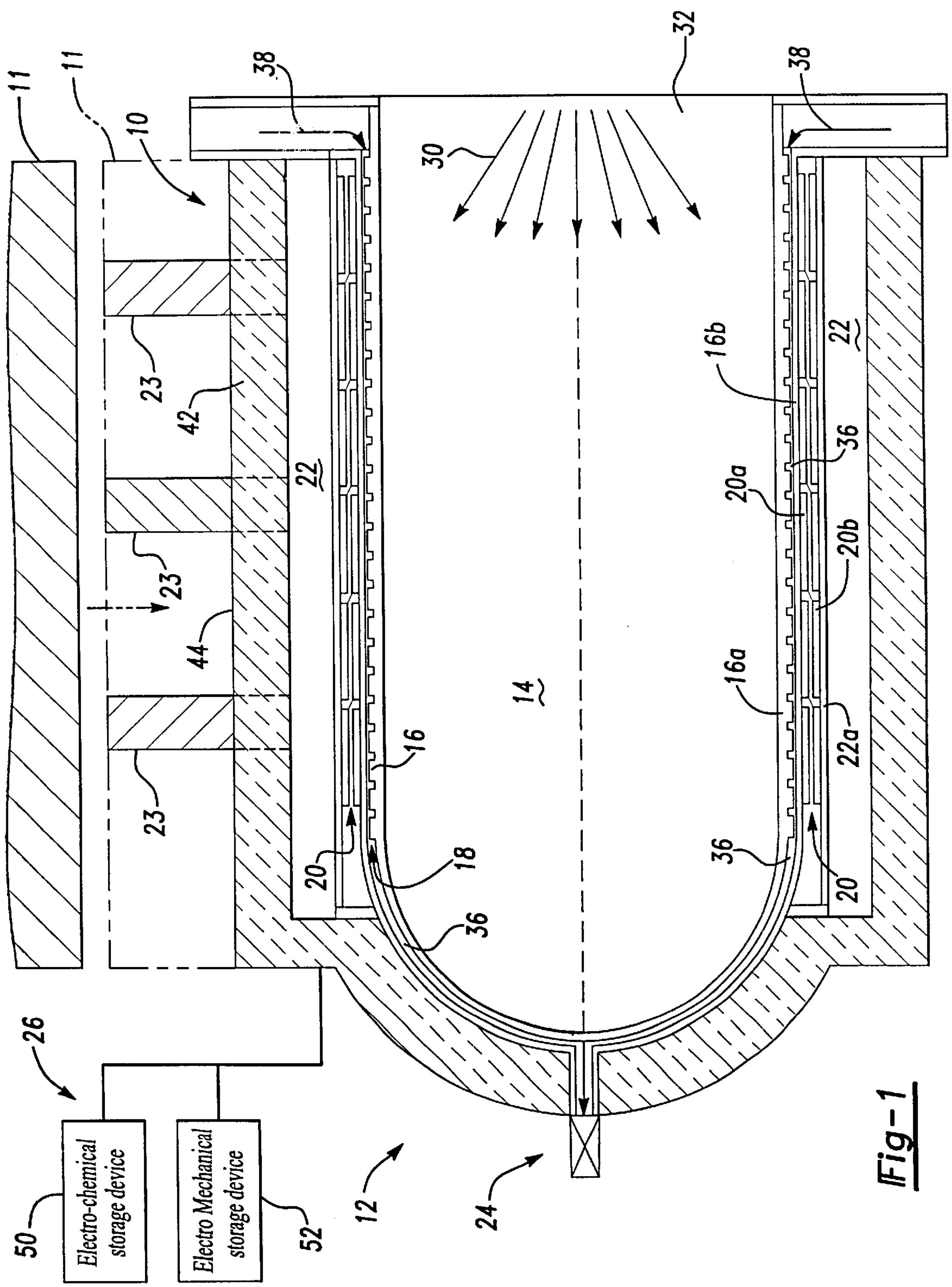
FIG. 1 is a partial sectional view of a portion of an engine constructed in accordance with a preferred embodiment of the present invention.

With reference to FIG. 1 of the drawings, a solar thermal engine for propelling and powering a spacecraft constructed in accordance with the teachings of a preferred embodiment of the present invention is generally indicated by reference numeral 10. Engine 10 is shown to include a movable thermal shield 11 and a housing 12 having an optical cavity 14, a heat exchanger 16, a propellant manifold or annulus 18, a plurality of static power converters 20, a heat pipe evaporator 22, a plurality of heat pipe condensers 23, a propellant nozzle 24 and an electrical energy storage device 26. Optical cavity 14 is operable for receiving the concentrated beam of sunlight 30 through an opening 32 from a mirror assembly (not shown) and converting it into ambient thermal energy. The term "ambient thermal energy" is used herein to designate thermal energy that has been converted from solar energy for immediate use in either propelling or powering a spacecraft. In this regard, ambient thermal energy is distinct from stored thermal energy (i.e., thermal energy that is stored and accumulated in a thermal energy storage device and removed as necessary for use in propelling and/or powering a spacecraft).

Heat exchanger 16 surrounds optical cavity 14 and is thermally coupled to propellant annulus 18 and the plurality of static power converters 20. Propellant annulus 18 is formed between an inner pressure boundary wall **16*a* and an outer pressure boundary wall 16*b*. Propellant annulus 18 includes at least one fluid conduit 36 that for distributing a flow of propellant 38 through heat exchanger 16. In the particular embodiment illustrated, fluid conduit 36 is a spiral groove formed in propellant inner pressure wall 16*a***.

Propellant annulus 18 is selectively operable in a heating mode wherein a flow of propellant 38 is introduced to propellant annulus 18 and directed through fluid conduit 36 to permit at least a first portion of the ambient thermal energy to be transmitted to the flow of propellant 38. Suitable propellants include hydrogen, ammonia or methane, but other types of propellants may also be used. The heated flow of propellant 38 is then directed to the converging portion of a converging/diverging rocket nozzle 24. The flow of propellant 38 is then expanded and accelerated through the converging/diverging rocket nozzle 24 to provide thrust.

Those skilled in the art will understand that most or nearly all of the ambient thermal energy may be consumed in the heating of the flow of propellant 38 depending on the rate with which the propellant flows through the propellant annulus 18. Ambient thermal energy not consumed in the heating of the flow of propellant 38 is directed through heat exchanger 16 to the plurality of static power converters 20 for use in generating electric power. In the particular embodiment illustrated, the plurality of static power converters 20 are arranged in a single cylindrical array that is concentric with and spaced radially outwardly from the propellant annulus 18. This arrangement provides a thermal energy flow path that maximizes the amount of ambient thermal energy that may be transmitted to the propellant annulus 18 while still providing a highly efficient thermal energy flow path to the plurality of static power converters 20.

The plurality of static power converters 20 may include any suitable device that converts thermal energy into electrical energy such as alkali metal thermoelectric converters, thermoelectric power converters and thermophotovoltic converters. Preferably, the plurality of static power converters 20 includes thermionic converters as these devices are operational at the elevated temperatures which are expected to be generated by the optical cavity 14, thereby reducing concerns for overheating the plurality of static power converters 20 during the times at which the propellant is not being heated. In the embodiment illustrated, static power converters 20 are thermionic converters having an emitter **20*a* that is coupled to the outer pressure boundary wall 16*b* and a collector 20*b* that is coupled to a cold wall 22*a* that is adjacent heat pipe evaporator 22**.

The portion of the ambient thermal energy that is not consumed to either heat the propellant or generate electrical energy is received by heat pipe evaporator 22 where it can be transmitted to the plurality of heat pipe condensers 23 and rejected by engine 10. Alternatively, heat pipe evaporator 22 may be configured to redistributed heat in a desired manner. For example, the residual portion of the ambient thermal energy may be used in a cascaded manner wherein it is used, for example, to preheat propellant or as a source of thermal energy for another type of static power converter that operates using lower temperature thermal energy. A layer of insulation 42 is disposed between the heat pipe evaporator 22 and the outer wall 44 of the housing 12 to ensure that the conversion of ambient thermal energy to electrical energy takes place at a relatively efficient rate.

Movable thermal shield 11 is coupled to housing 12 and movable between a first position wherein thermal shield 11 is adjacent housing 12 and a second position wherein thermal shield 11 is spaced apart from housing 12. Positioning of thermal shield 11 in the first position permits thermal shield 11 to insulate heat pipe condensers 23 to thereby retard or inhibit the ability of heat pipe condensers 23 to reject heat, permitting solar thermal engine 10 to conserve heat when performing operations such as heating the flow of propellant 38. Positioning of thermal shield 11 in the second position permits heat pipe condensers 23 to reject heat in an unincumbered manner, as when solar energy is being used by solar thermal engine 10 only for the production of electrical energy.

Electrical energy produced by the plurality of static power converters 20 is directed to an electrical energy storage device 26 for subsequent use. This configuration is highly advantageous over systems that store heat for subsequent conversion to electrical energy due to the relative inefficiency with which thermal energy is converted to electrical energy. Consequently, the configuration of the present invention permits a substantial reduction in the mass of the engine 10 as compared to engines that store thermal energy for use in propelling and powering a craft. Preferably, the electrical energy storage device 26 includes an electrochemical device 50, such as a lithium ion battery. The electrical energy storage device 26 may additionally or alternatively include an electromechanical storage device 52, such as a flywheel. One suitable flywheel device is disclosed in U.S. Pat. No. 4,668,885 entitled "Flywheel Energy Storage Device", the disclosure of which is hereby incorporated by reference as if fully set forth herein. Electromechanical storage devices having flywheels may be advantageously employed to impart rotational energy to a spacecraft to aid in the repositioning of the spacecraft in a known manner.

Figure 2:
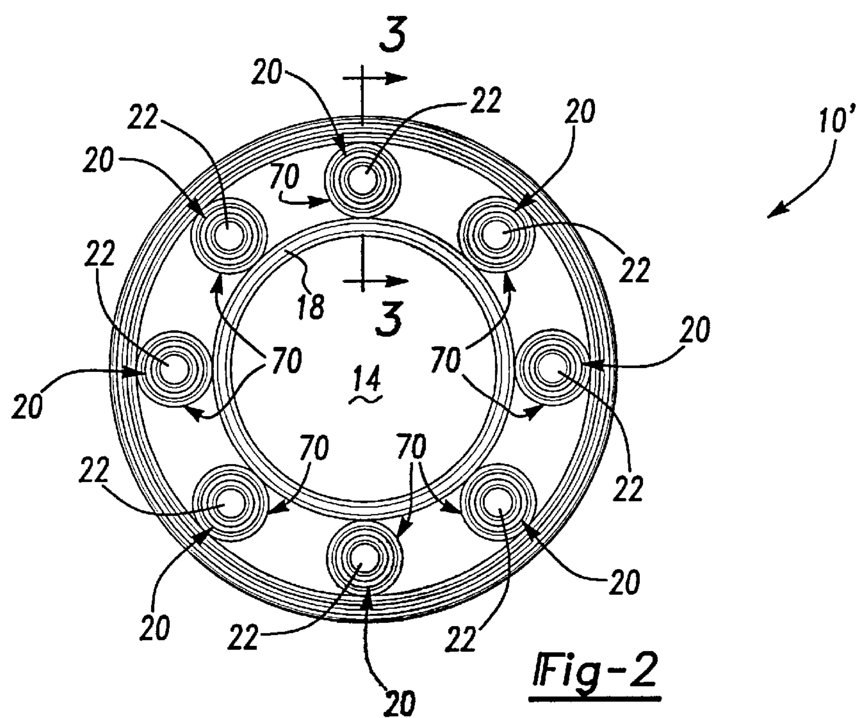
FIG. 2 is an elevational view of an engine constructed in accordance with a first alternate embodiment of the present invention.
Figure 3:
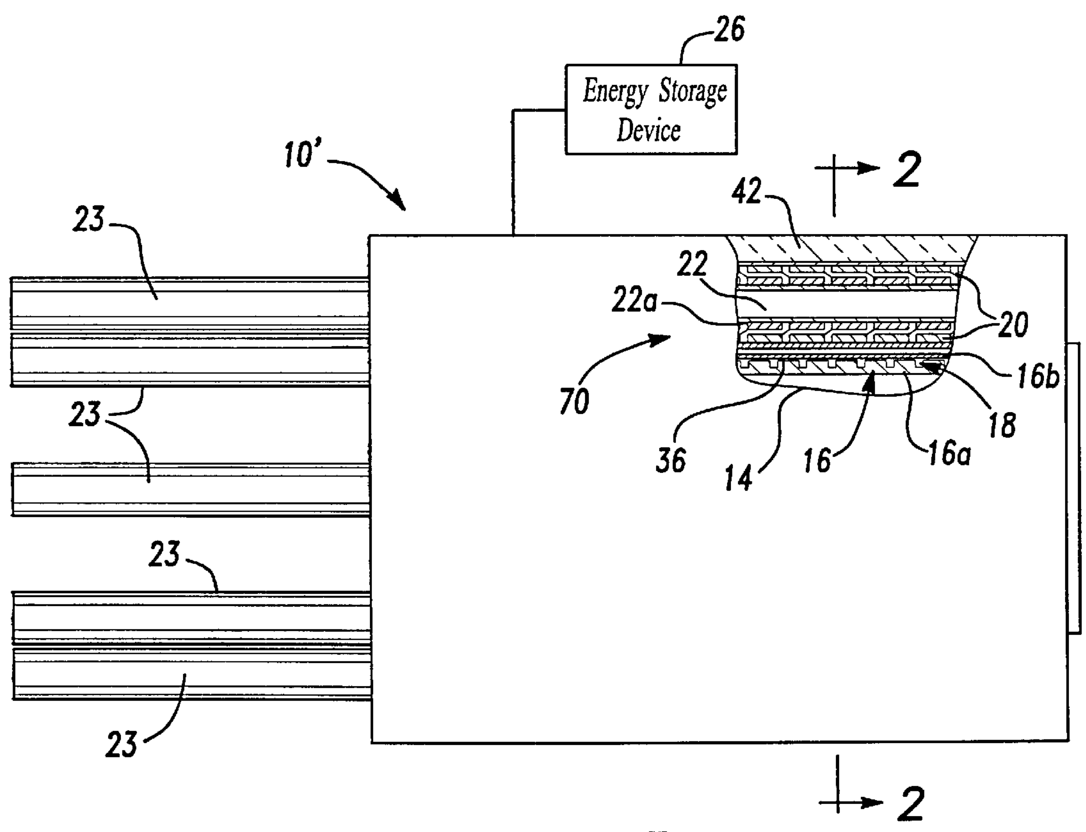
FIG. 3 is a partial sectional view of the engine of FIG. 2 taken along the line 3—3.

While the plurality of static power converters 20 have been described thus far as being arranged in a cylindrical array that is generally concentric with the optical cavity 14, those skilled in the art will appreciate that the invention, in its broader aspects, may be constructed somewhat differently. For example, the plurality of static power converters 20 may be arranged in several arrays as shown in FIGS. 2 and 3.

In this arrangement, the engine 10' is shown to include a plurality of static power converters 20 that are arranged in a plurality of cylindrical arrays 70 with each of the plurality of cylindrical arrays 70 being disposed radially outwardly of the propellant annulus 18. Construction in this manner provides a thermal energy flow path that maximizes the amount of ambient thermal energy that may be transmitted to the propellant annulus 18 while providing a slightly less efficient thermal energy flow path to the plurality of static power converters 20 as compared to the arrangement illustrated in FIG. 1. This arrangement is advantageously employed, for example, where less ambient thermal energy is needed to operate the static power converters 20, as when alkali metal thermoelectric converters, thermoelectric power converters or thermophotovoltic converters are employed.

Figure 4:
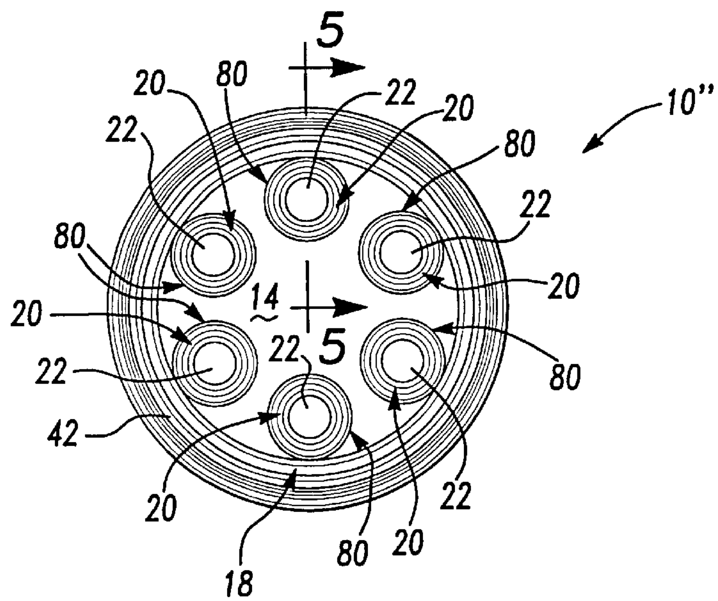
FIG. 4 is an elevational view of an engine constructed in accordance with a second alternate embodiment of the present invention.
Figure 5:
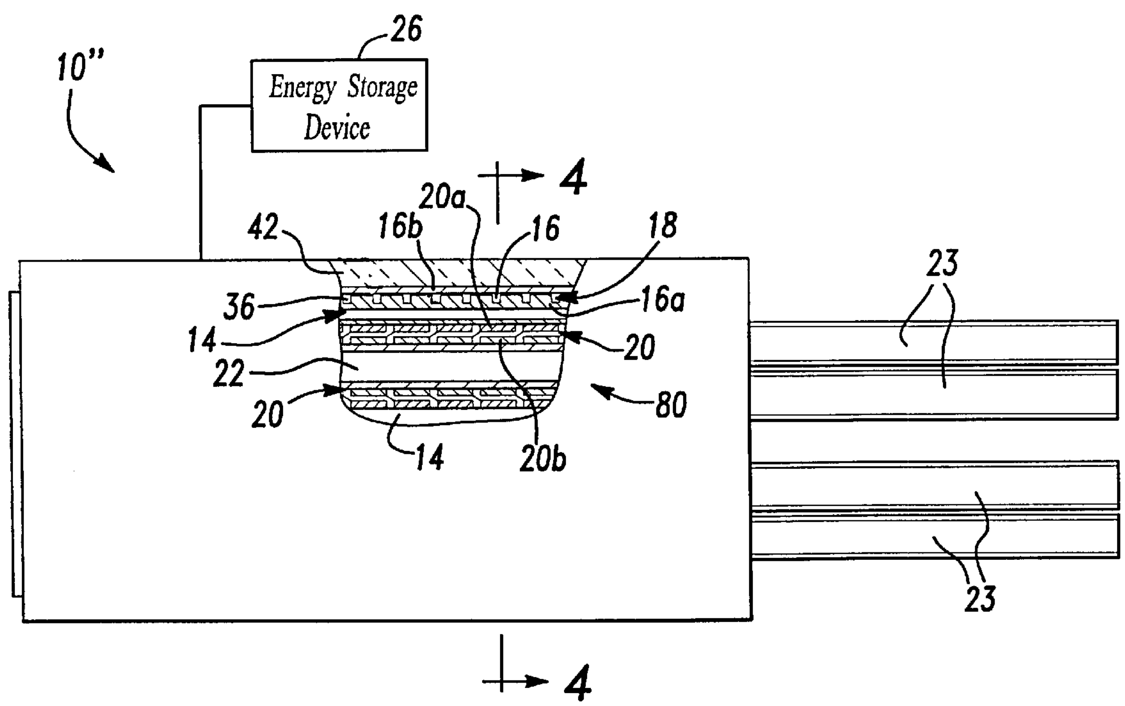
FIG. 5 is a partial sectional view of the engine of FIG. 4 taken along the line 5—5.

Another arrangement of the static power converters 20 is illustrated in FIGS. 4 and 5. In this arrangement, engine 10" is similar to engine 10' except that the plurality of static power converters 20 are arranged in a plurality of cylindrical arrays 80 with each of the plurality of cylindrical arrays 80 being disposed radially inwardly of the propellant annulus 18. Construction in this manner provides a thermal energy flow path that maximizes the amount of ambient thermal energy that may be transmitted to the plurality of static power converters 20 while still providing a highly efficient thermal energy flow path to the propellant annulus 18.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A solar thermal engine for propelling and powering a craft, the solar thermal engine comprising:

a housing having an optical cavity adapted for receiving a beam of concentrated sunlight and converting the beam into ambient thermal energy;

a propellant annulus coupled to the housing and selectively operable in a heating mode wherein the propellant annulus transmits at least a first portion of the ambient thermal energy to heat a flow of propellant;

a plurality of static power converters coupled to the housing, the static power converters receiving the first portion of the ambient thermal energy when the propellant annulus is not operated in the heating mode, the plurality of static power converters employing the first portion of the ambient thermal energy to generate electrical energy; and an electrical energy storage device coupled to the plurality of static power converters, the electrical energy storage device receiving and storing the electrical energy generated by the plurality of static power converters.

2. The solar thermal engine of claim 1, wherein a heat exchanger surrounds the optical cavity and is coupled to the propellant annulus, the heat exchanger operable for transferring the at least a first portion of the ambient thermal energy to the propellant annulus.

3. The solar thermal engine of claim 2, wherein the heat exchanger includes a first boundary wall and a second boundary wall that is spaced radially outwardly of the first boundary wall, wherein the propellant annulus is formed between the first and second boundary walls and wherein the propellant annulus is disposed between the first boundary wall and the plurality of static power converters.

4. The solar thermal engine of claim 3, wherein the plurality of static power converters are arranged in a single cylindrical array disposed radially outwardly of the propellant annulus.

5. The solar thermal engine of claim 4, wherein a surface of the single cylindrical array of static power converters shares a common boundary with a heat exchanger coolant passage.

6. The solar thermal engine of claim 3, wherein the plurality of static power converters are arranged in a plurality of cylindrical arrays, each of the plurality of cylindrical arrays being disposed radially outwardly of the propellant annulus.

7. The solar thermal engine of claim 1, wherein the plurality of static power converters are arranged in a plurality of cylindrical arrays disposed within the optical cavity.

8. The solar thermal engine of claim 7, wherein a heat exchanger surrounds the optical cavity and is coupled to the propellant annulus, the heat exchanger operable for transferring the at least a first portion of the ambient thermal energy to the propellant annulus.

9. The solar thermal engine of claim 8, wherein the heat exchanger includes a first boundary wall and a second boundary wall that is spaced radially outwardly of the first boundary wall, wherein the propellant annulus is formed between the first and second boundary walls and wherein the propellant annulus is disposed between the second boundary wall and the plurality of static power converters.

10. The solar thermal engine of claim 1, wherein the electrical energy storage device includes an electrochemical energy storage device.

11. The solar thermal engine of claim 1, wherein the electrical energy storage device includes an electromechanical energy storage device.

12. The solar thermal engine of claim 1, wherein the plurality of static power converters includes a converter selected from a group consisting of alkali metal thermoelectric converters, thermionic converters, thermoelectric power converters and thermophotovoltic converters.

13. The solar thermal engine of claim 1, further including at least one heat pipe condensers for rejecting a remainder portion of the ambient thermal energy from the engine.

14. A solar thermal engine for propelling and powering a craft, the solar thermal engine comprising:

a housing having an optical cavity for receiving a beam of concentrated sunlight and converting the beam into ambient thermal energy;

a propellant annulus coupled to the housing and operable for selectively heating a flow of propellant, the propellant annulus transmitting at least a first portion of the ambient thermal energy to the flow of propellant when the ambient thermal energy is employed to heat the flow of propellant;

a plurality of static power converters for receiving a second portion of the ambient thermal energy and generating electrical energy when a magnitude of the second portion of thermal energy exceeds a predetermined thermal energy threshold; and an electrical energy storage device coupled to the plurality of static power converters, the electrical energy storage device receiving and storing the electrical energy generated by the plurality of static power converters.

15. The solar thermal engine of claim 14, wherein the electrical energy storage device includes a storage device selected from a group consisting of an electrochemical energy storage device and an electromechanical energy storage device.

16. The solar thermal engine of claim 14, wherein the plurality of static power converters includes a converter selected from a group consisting of alkali metal thermoelectric converters, thermionic converters, thermoelectric power converters and thermophotovoltic converters.

17. A method for propelling and powering a craft, the method comprising the steps of:

providing an engine having an optical cavity;

directing a beam of concentrated light into the optical cavity;

converting the beam of concentrated light into thermal energy;

determining if a propellant is to be heated;

transmitting at least a first portion of the ambient thermal energy to heat the propellant if the propellant is to be heated;

transmitting at least the first portion of the ambient thermal energy to a static power converter to generate electrical energy if the propellant is not to be heated; and storing the electrical energy in an electrical energy storage device.

18. The method of claim 17, further comprising the step of rejecting the ambient thermal energy not consumed during the steps of heating the propellant and converting the second portion of the ambient thermal energy into electrical energy.

19. The method of claim 17, wherein a storage device selected from a group consisting of an electrochemical energy storage device and an electromechanical energy storage device is employed in the step of storing the electrical energy.

20. The method of claim 17, wherein a converter selected from a group consisting of alkali metal thermoelectric converters, thermionic converters, thermoelectric power converters and thermophotovoltic converters is employed in the step of transmitting at least the first portion of the ambient thermal energy to the static power converter to generate electrical energy.

* * * * *